(12) United States Patent
Lee

(10) Patent No.: US 8,054,488 B2
(45) Date of Patent: Nov. 8, 2011

(54) IMAGE FORMING APPARATUS TO SUPPLY A FILE TRANSMISSION AND RECEPTION LIST AND CONTROL METHOD THEREOF

(75) Inventor: Hyun-suk Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1073 days.

(21) Appl. No.: 11/487,987

(22) Filed: Jul. 18, 2006

(65) Prior Publication Data

US 2007/0030511 A1 Feb. 8, 2007

(30) Foreign Application Priority Data

Aug. 8, 2005 (KR) ........................ 10-2005-0072270

(51) Int. Cl.
*G06F 3/12* (2006.01)
*G06F 3/00* (2006.01)
*G06F 13/28* (2006.01)
*G06F 13/42* (2006.01)
*H04N 1/40* (2006.01)
*H04N 1/04* (2006.01)

(52) U.S. Cl. ......... 358/1.15; 358/435; 358/476; 710/11; 710/20; 710/105

(58) Field of Classification Search .................. 358/1.15, 358/448, 476, 474, 435; 710/20, 30, 314, 710/105, 11
See application file for complete search history.

(56) References Cited

U.S. PATENT DOCUMENTS

| 7,061,633 | B1 * | 6/2006 | Shima ........................... 358/1.15 |
| 2002/0147646 | A1 * | 10/2002 | Ogura et al. .................... 705/14 |
| 2005/0134906 | A1 * | 6/2005 | Takashima ................... 358/1.15 |
| 2005/0289126 | A1 * | 12/2005 | Koguchi .......................... 707/3 |

FOREIGN PATENT DOCUMENTS

| JP | 7-250203 | 9/1995 |
| JP | 9-294198 | 11/1997 |
| JP | 11-177799 | 7/1999 |
| JP | 11-341212 | 12/1999 |
| KR | 2001-107856 | 12/2001 |

OTHER PUBLICATIONS

Postel et al. Specification of File Transfer Protocol (FTP) RFC959 Oct. 1985 Network Working Group pp. 1-70.*
Rutgers Introduction to the Internet Protocol Jul. 1987 University of New Jersey pp. 5-12.*

* cited by examiner

*Primary Examiner* — Benny Tieu
*Assistant Examiner* — Ngon Nguyen
(74) *Attorney, Agent, or Firm* — Stanzione & Kim, LLP

(57) ABSTRACT

An image forming apparatus to supply a file transmission and reception list, and a control method thereof. The image forming apparatus may include a storing part and a controlling part to store a list of transmission and reception for transmitted and received files using an FTP (File Transfer Protocol). The file transmission and reception list may include a user name, a date of file transmission and reception, a file name, a file size, an address of a file transmitter recipient, and a user ID or password to log in an FTP server transmitting and receiving the file through the image forming apparatus.

21 Claims, 4 Drawing Sheets

IMAGE FORMING APPARATUS TO SUPPLY A FILE TRANSMISSION AND RECEPTION LIST AND CONTROL METHOD THEREOF

CROSS-REFERENCE TO RELATED APPLICATIONS

This application claims priority under 35 U.S.C. §119(a) from Korean Patent Application No. 2005-72270, filed Aug. 8, 2005, in the Korean Intellectual Property Office, the entire contents of which are incorporated herein by reference.

BACKGROUND OF THE INVENTION

1. Field of the Invention

The present general inventive concept relates to an image forming apparatus and a control method thereof. More particularly, the present general inventive concept relates to an image forming apparatus to supply a file transmission and reception list, and a control method thereof.

2. Description of the Related Art

An image forming apparatus is an apparatus for forming an image by printing data on paper, such as a copier, a facsimile machine, and an MFP (Multi Function Peripheral). A network image forming apparatus is enabled to receive and transmit data through a network by mounting a network interface card in the image forming apparatus.

Conveniently, the network image forming apparatus can independently access the network without a host apparatus to perform network works. However, any user of the network image forming apparatus can transmit files externally through the network, thereby causing security problems.

In order to prevent such security problems, an image forming apparatus is being developed to limit the user's ability to output documents and to receive and transmit files.

Such an image forming apparatus having a security function can prevent secure files from being transmitted or received externally to a certain degree. However, when the secure files have already been transmitted through use of the image forming apparatus, it is almost impossible to determine who was responsible for the unwanted transmission.

SUMMARY OF THE INVENTION

The present general inventive concept provides an image forming apparatus capable to supply a file transmission and reception list and a control method thereof to solve at least the above problems and/or disadvantages of the related art and to provide at least the advantages described below.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including a storing part, and a controlling part to control the storing part to store a transmission and reception list corresponding to one or more files that are transmitted to and received from the image forming apparatus using a File Transfer Protocol.

The file transmission and reception list may include at least one of a user name, a date of file transmission, a date of file reception, a file name, a file size, an address of a file recipient, a user ID, and a user password to log in an FTP server having the files.

The image forming apparatus may further include an inputting part to receive a display command to display the file transmission and reception list.

The controlling part may display the file transmission and reception list on a displaying part.

The controlling part may format the file transmission and reception list and display the formatted list.

The formatted list may include at least one of statistics on a number and sizes of files transmitted and received during a time period, and specifications of files transmitted and received by a user.

The controlling part may transmit the file transmission and reception list to an external host apparatus.

The image forming apparatus may further include a printing part to print the file transmission and reception list.

The controlling part may assign an unauthorized user name a no-name value to transmit and receive data files without user authorizations.

The foregoing and/or other aspects and utilities of the present general inventive concept may also be achieved by providing a method of controlling an image forming apparatus, the method including transmitting and receiving files using a File Transfer Protocol, and storing a file transmission and reception list containing information corresponding to the transmission and reception operations of the files.

The method may include storing at least one of a user name, a date of file transmission, a date of file reception, a file name, a file size, an address of a file recipient, a user ID, and a user password to log in an FTP server transmitting and receiving files with respect to the image forming apparatus.

The method may further include receiving a display command to display the file transmission and reception list. The method may further include displaying the file transmission and reception list on a displaying part.

The displaying of the file transmission and reception list may include displaying the file transmission and reception list in a predetermined format.

The predetermined format may include at least one of statistics on a number and sizes of files transmitted and received during a time period, and displaying specifications of the files transmitted and received by a user.

The method may further include receiving a display command to display the file transmission and reception list from an external host apparatus, and transmitting the file transmission and reception list to the host apparatus. The method may further include receiving a print command to print the file transmission and reception list and printing the file transmission and reception list.

The files may include unauthorized transmitted and received files and may be stored under a no-name alias in the file transmission and reception list.

The foregoing and/or other aspects and utilities of the present general inventive concept may also be achieved by providing a data transmission and reception network system, including at least one image forming apparatus to print data and to generate a data transmission and reception list through a network according to the data using a File Transfer Protocol, at least one host apparatus to transmit the data to the image forming apparatus and to display the data transmission and reception list transmitted from the at least one image forming apparatus, and at least one server to upload and store the data from the image forming apparatus and to download the data to the image forming apparatus according to a control of the at least one host apparatus.

The data transmission and reception list may include information on all data transmitted and received between the at least one image forming apparatus and the at least one server.

The at least one image forming apparatus may include an input unit to receive one or more input commands from a user, a display unit to display second data according to the one or more input commands, a scanning unit to scan a second image of a document according to the one or more input commands, a storing unit to store data transmitted from the at least one host apparatus, the data transmitted from the at least one server, the second data transmitted from the scanning unit, the data transmission and reception list, and user identification and password information, and a controller to control operations of the input unit, the display unit, the scanning unit, and the storing unit, and to update the data transmission and reception list. The at least one image forming apparatus may further include a printing unit to print one of the data and the second data according to the one or more input commands, a facsimile unit to transmit the second data according to the one or more input commands, a card interface unit to receive one of the data and the second data from an external storing medium, a File Transfer Protocol unit to transmit and receive the data from the at least one server, and a communication interface unit to connect the at least one image forming apparatus to the network.

The foregoing and/or other aspects and utilities of the present general inventive concept may also be achieved by providing a method of controlling the transmission of data through a network, the method including determining whether a user has authorization to use the network, selecting one or more files to transmit through the network, selecting a format in which the files are to be transmitted through the network, updating a data transmission and reception list based on an identity of the user and the one or more files to be transmitted through the network, accessing the network, and transmitting the one or more files through the network.

The foregoing and/or other aspects and utilities of the present general inventive concept may also be achieved by providing a method of controlling the reception of data through a network, the method including determining whether a user has authorization to use the network, selecting one or more files to receive through the network, selecting a format in which the files are to be received through the network, updating a data transmission and reception list based on an identity of the user and the one or more files to be received through the network, accessing the network, and receiving the one or more files through the network.

The foregoing and/or other aspects and utilities of the present general inventive concept may also be achieved by providing a method of displaying a data transmission and reception list through a network, the data transmission and reception list including information on all data transmitted and received between the at least one image forming apparatus and the at least one server, the method including determining whether a user has authorization to use the network, selecting a format in which the data transmission and reception list is to be displayed, accessing the network, and displaying the data transmission and reception list.

The foregoing and/or other aspects and utilities of the present general inventive concept may also be achieved by providing an image forming apparatus, including a scanning part to scan one or more images to generate data, a storing part, and a controlling part to control the storing part to store a list corresponding to the data when the data is transmitted from the image forming apparatus.

The foregoing and/or other aspects and utilities of the present general inventive concept may also be achieved by providing an image forming system, including an interface to receive data from an external device, a scanning part to scan an image to generate second data, a storing part, and a controlling part to control the storing part to store a list corresponding to the data and the second data. The external device may include at least one of an image forming apparatus, a File Transfer Protocol server, and a host apparatus. The control part may generate the list when the data and the second data are uploaded or downloaded. The image forming system may further include a print engine to print one of the data and the second data, in which the control part generates the list when the one of the data and the second data are printed.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
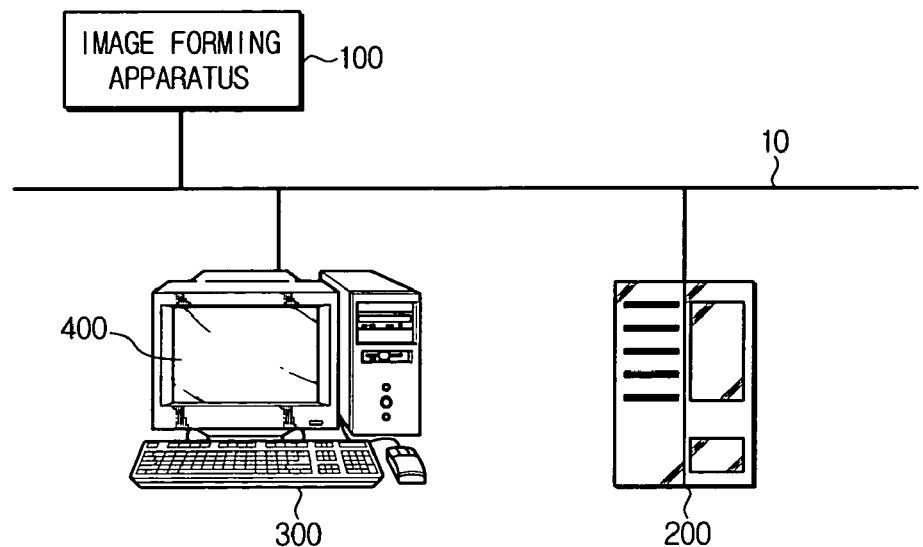
FIG. 1 is a block diagram illustrating a data file transmission and reception system using FTP (File Transfer Protocol) according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a data file transmission and reception system according to an embodiment of the present general inventive concept.

Referring to FIG. 1, the data file transmission and reception system using the FTP may include an image forming apparatus 100, an FTP (File Transfer Protocol) server 200, and a host apparatus 300. Although a single FTP server 200 and a single host apparatus 300 are illustrated in FIG. 1, the data file transmission and reception system may include a plurality of FTP servers and/or a plurality of host apparatuses.

The image forming apparatus 100 may print a predetermined image data file, may function as an FTP client, and may be connected to at least one FTP server 200, and at least one host apparatus 300.

The FTP server 200 may upload and store a data file uploaded from the image forming apparatus 100 using the FTP, or may download the data file from the FTP server 200 to the image forming apparatus 100. The data file may be an image or text data file, and the image forming apparatus prints an image according to the image or text data file. The image forming apparatus 100 and the FTP server 200 may be interconnected through a network 10. The network 10 may be a wire network or a wireless network.

The host apparatus 300 may transmit the image data file to the image forming apparatus 100, which may print the image onto a printing medium. According to an embodiment of the present general inventive concept, the host apparatus 300 may request the image forming apparatus 100 to transmit a file transmission and reception list to the host apparatus 300. The host apparatus 300 may display the file transmission and reception list transmitted from the image forming apparatus 100 on a predetermined displaying unit, such as a monitor 400. The file transmission and reception list is a list composed of information on all data files transmitted and received between the image forming apparatus 100 and the FTP server 200, which will be described hereafter.

The host apparatus 300 may also transmit a command to the image forming apparatus 100 for the image forming apparatus 100 to print the file transmission and reception list. The host apparatus 300 may be connected to the image forming apparatus 100 through, for example, a network or directly through a parallel port or a USB (Universal Serial Bus) port.

Figure 2:
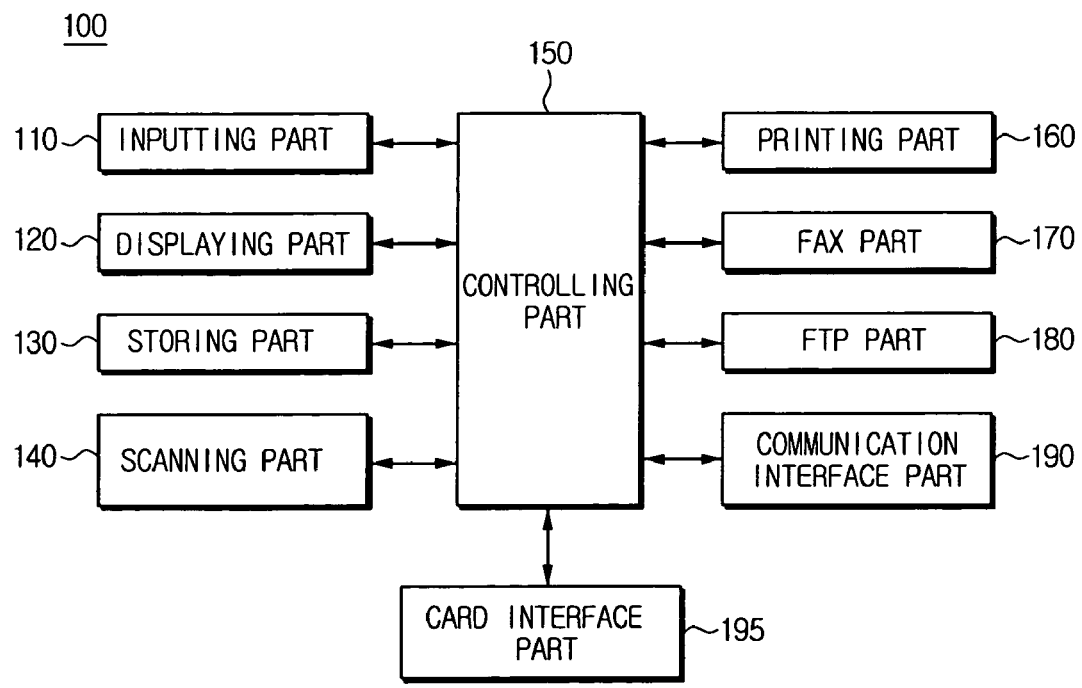
FIG. 2 is a detailed block diagram illustrating an image forming apparatus of FIG. 1.

FIG. 2 is a detailed block diagram illustrating the image forming apparatus 100 of FIG. 1.

Referring to FIGS. 1 and 2, the image forming apparatus 100 according to an embodiment of the present general inventive concept may include an inputting part 110, a displaying part 120, a storing part 130, a scanning part 140, a controlling part 150, a printing part 160, a FAX (facsimile) part 170, an FTP part 180, a communication interface part 190, and a card interface part 195.

The inputting part 110 may have a plurality of function buttons, a plurality of number buttons, and a plurality of letter buttons. A user may input an operation command into the inputting part 110 of the image forming apparatus 100, which the inputting unit part 110 transmits to the controlling part 150. According to an embodiment of the present general inventive concept, the inputting part 110 may be input with commands to select whether to transmit or receive a data file to or from the FTP server 200. For example, a user may input a command to the image forming apparatus 100 to download the data file from the FTP server 200 and/or to display the file transmission and reception list.

In addition, the image forming apparatus 100 may perform a user authorization operation before allowing the user to access or use all or some of the functions of the image forming apparatus 100. When the image forming apparatus 100 performs a user authentication function, a user needs to input an ID and password unique to the user into the inputting part 110 for authorization to use all of some of the functions of the image forming apparatus 100. The inputting part 110 then transmits the input ID and password to the controlling part 150 to determine whether to grant the access to the user. For example, when the inputting part 110 requests the user to input the ID and the password to obtain access to use the image forming apparatus 100 to download the data file from the FTP server 200 or to upload the data file to the FTP server 200, the ID and password must correspond to the user and the user must have permission to access the FTP server 200.

The displaying part 120 may externally-display information on operations of the image forming apparatus 100 under the control of the controlling part 150. The displaying part 120 may be, for example, an LCD panel. According to an embodiment of the present general inventive concept, the displaying part 120 displays the file transmission and reception list in a predetermined form.

The storing part 130 may store various control programs and data files corresponding to various functions of the image forming apparatus 100. In particular, the storing part 130 according to an embodiment of the present general inventive concept may store the file transmission and reception list. When the image forming apparatus 100 performs the user authentication function, the storing part 130 may store the ID and the password of the user to keep a record of users attempting to access the FTP server 200, and to keep a record of IDs and passwords of authorized users of the image forming apparatus 100. The storing part 130 may also store data files transmitted from the host apparatus 300 and/or from the FTP server 200, and image data files created by and transmitted from the scanning part 140 for transmission of the scanned document.

The scanning part 140 may scan a document under the control of the controlling part 150 to create the image data file, such as a digitalized image data file.

The user may input into the inputting part 110 a command to the image forming apparatus 100 to print the data file created by the scanning unit 140 and stored at the storing part 130. The printing part 160 then prints the digitalized image data file on, for example paper, under the control of the controlling part 150. For example, the user may input into the inputting unit 140 a command to print the file transmission and reception list in a predetermined format, and the printing part 160 may then print the file transmission and reception list under the control of the controlling part 150.

Under the control of the controlling part 150, the FAX part 170 may form a loop with a PSTN (Public Switched Telephone Network, not illustrated), may call a partner image forming apparatus (not illustrated), and may transmit the digitalized image data created by the scanning part 140. Specifically, the FAX part 170 may transmit the digitalized image data from the partner image forming apparatus (not illustrated) to the printing part 160, so that the digitalized image data may be printed under the control of the controlling part 150 by the printing part 160.

The card interface part 195 may transmit and receive data between an external storing medium (not illustrated), such as XD, CF, SD, SM, MMC, and MD memory cards, and the image forming apparatus 100.

The FTP part 180 may transmit and receive the data file transmitted from the FTP server using the FTP under the control of the controlling part 150. Using the FTP, the FTP part 180 may read a folder name (or a directory name) of the FTP server 200, and may read file names and displays on the displaying part 120, under the control of the controlling part 150. The user may select a storage location of the data file to be transmitted from the image forming apparatus 100, or the data file to be received by the image forming apparatus 100.

The communication interface part 190 connects the image forming apparatus 100 to the host apparatus 300 and/or to the FTP server 200 through the network 10 and supports the transmission and reception of data files. The interface part 190 may be, for example, directly-connected to the host apparatus 300 through a parallel port or a USB port.

The controlling part 150 may control operations of the image forming apparatus 100. According to an embodiment of the present general inventive concept, the controlling part 150 may compare an ID and a password of a user pre-stored at the storing part 130, and may authorize the user to use the image forming apparatus 100 when the user enters an ID and a password input corresponding to the stored ID and password for the user. Conversely, the controlling part 150 may prevent the user from using all of the functions of the image forming apparatus 100, or may limit the user to a specific function or functions, when the user enters an ID and a password that does not correspond to the stored ID and password for the user. For example, when an ID and a password input by the user do not match the stored ID and password for the user, the user may be granted access to the image forming apparatus 100 only to receive a data file from the FTP server 200 and to print the data file, but not to transmit a data file stored at the storing part 130 or at the external storage medium (not illustrated) to the FTP server 200.

An authorized user may request the FTP part 180 to transmit the data file to the FTP server 200 using a desired transmission method. When the user requests the FTP part 180 to transmit the data file to the FTP server 200 using the desired transmission method, the controlling part 150 controls the FTP part 180 to transmit the data file to the FTP server 200 according to the desired transmission method. For example, the user may request the FTP part 180 to transmit a data file stored at the external storage medium (not illustrated), a data file stored at the storage part 130, or an image data file created by the scanning part 140 by scanning a document at the scanning part 140. The controlling part 150 may also control the FTP part 180 to receive a data file, selected by the user, from the FTP server 200 and to store the data file at the storing part 130.

The controlling part 150 updates the stored information on all of the data file transmissions and/or receptions in the file transmission and reception list whenever a user transmits and/or receives a data file to/from the FTP server 200. The file transmission and reception list may include, for example, a user name, a file transmission and reception data, a file name, a file size, and an address of a partner image forming apparatus transmitting and/or receiving the file. The user name may be, for example, an ID having the user's authorization status or may be the user's real name corresponding the user's ID. When the user is not prompted by the inputting part 110 to input the user's ID and password, the user may input the user's name, without prompting, under a designation 'no name'. The file transmission and reception list may be a file in CSV (Comma Separate Value), which separates each item in the list using commas. After receiving the ID and the password for logging into the FTP server 200 through the inputting part 110 for the user, the controlling part 150 adds the ID and the password to the file transmission and reception list, and transmits to the FTP server 200.

An authorized user may input a command into the input part 110 to display the list. Similarly, the host apparatus 300 may issue a command to display the list. When receiving the command to display the file transmission and reception list from the inputting part 110, the controlling part 150 may make the file transmission and reception list in a predetermined form and display the list on the displaying part 120. When receiving the command to display the file transmission and reception list from the host apparatus 300, the controlling part 150 may transmit the file transmission and reception list, e.g., in the CSV form, to the host apparatus 300 and to display the list on a predetermined displaying medium (not illustrated) prepared in the host apparatus 300.

The user may request the file transmission and reception list for all files transmitted from and received by the image forming apparatus 100 through the inputting part 110 or through the host apparatus 300. The user may also request the file transmission and reception list for all files transmitted and received by the image forming apparatus 100 during a particular month or during another time period, or by a particular user. The user may request the file transmission and reception list of statistics on the number and the sizes of files daily or monthly, or during another time period, transmitted and received by the image forming apparatus 100 through the inputting part 110 or through the host apparatus 300.

Tables 1 through 4 are examples of a file transmission and reception list provided from an image forming apparatus according to an embodiment of the present general inventive concept.

TABLE 1

| User | Date of Transmission And Reception | File Name | File Size (Byte) | Address of Transmission and Reception | Others |
|---|---|---|---|---|---|
| Hyeon-seok Lee | 2005 Apr. 11 09:20:18 | report.doc | 213215 | 1.23.35.56 | |
| Gi-won Kim | 2005 Apr. 12 10:22:10 | psc001.jpg | 332512 | ftp.abcd.com | |
| Ji-eun Kang | 2005 Apr. 13 09:22:18 | temp.zip | 678897 | 123.456.789.12 | |
| Hyeon-seok Lee | 2005 Apr. 14 13:20:10 | bssttes.exe | 1326654 | 111.100.99.88 | |
| Hye-jin Han | 2005 Apr. 15 12:42:37 | need.dat | 3677966 | 67.21.254.26 | |
| Jeong-seok Park | 2005 Apr. 16 09:19:50 | vmware.dat | 32655 | ftp.defg.com | |
| Jeong-seok Park | 2005 Apr. 17 09:20:07 | wmware.exe | 8799644 | ftp.defg.com | |
| Jeong-seok Park | 2005 Apr. 17 09:20:18 | wmware.ini | 321156 | ftp.defg.com | |
| Jeong-seok Park | 2005 Apr. 17 09:20:30 | wmawredata.dat | 966871 | ftp.defg.com | |
| Jeong-seok Park | 2005 Apr. 17 09:21:05 | wmware.cap | 36697778 | ftp.defg.com | |
| Jeong-seok Park | 2005 Apr. 17 09:21:27 | redme.txt | 75654 | ftp.defg.com | |

Table 1 is a list of all files transmitted and received by the image forming apparatus 100 in April 2005.

TABLE 2

| User | Date of Transmission And Reception | File Name | File Size (Byte) | Address of Transmission and Reception | Others |
|---|---|---|---|---|---|
| Hyeon-seok Lee | 2005 Apr. 11 9:20:18 | report.doc | 213215 | 1.23.35.56 | |
| Hyeon-seok Lee | 2005 Apr. 14 3:20:10 | bssttes.exe | 1326654 | 111.100.99.88 | |

TABLE 2-continued

| User | Date of Transmission And Reception | File Name | File Size (Byte) | Address of Transmission and Reception | Others |
|---|---|---|---|---|---|
| Hyeon-seok Lee | 2005 Apr. 23 7:03:54 | pic.gif | 423367 | 100.100.100.100 | |

Table 2 is a list of all files transmitted and received by the image forming apparatus 100, by a particular user named 'Hyeon-seok Lee' in April 2005.

TABLE 3

| Date of Transmission And Reception | Total Case | Total Byte |
|---|---|---|
| 2005 Apr. 11 | 1 | 213215 |
| 2005 Apr. 12 | 1 | 332512 |
| 2005 Apr. 13 | 1 | 678897 |
| 2005 Apr. 14 | 1 | 13266654 |
| 2005 Apr. 15 | 1 | 3677966 |
| 2005 Apr. 16 | 1 | 32655 |
| 2005 Apr. 17 | 5 | 46818104 |
| 2005 Apr. 22 | 1 | 900312 |
| 2005 Apr. 23 | 1 | 423367 |

Table 3 is a list of daily statistics on a number and sizes of all files transmitted and received by the image forming apparatus 100 in April 2005.

TABLE 4

| Month of Transmission And Reception | Total Case | Total Size (MB) | Total Transmission (MB) | Total Reception (MB) |
|---|---|---|---|---|
| 1 | 20 | 3.4 | 1.2 | 2.2 |
| 2 | 65 | 18.2 | 10 | 8.2 |
| 3 | 15 | 7.3 | 5.1 | 2.2 |
| 4 | 13 | 6 | 1 | 5 |
| 5 | 0 | 0 | 0 | 0 |
| 6 | 70 | 64.8 | 48.8 | 16 |
| 7 | 11 | 11.2 | 7 | 4.2 |

Table 4 is a list of daily statistics on a number and sizes of files transmitted and received by the image forming apparatus 100 from January 2005 to July 2005.

The file transmission and reception lists of Tables 1 through 4 are just examples, and file transmission and reception lists may include more or less topics than those illustrated, and may be provided to the user in various other forms and formats.

When receiving the command to print the file transmission and reception list from the inputting part 110 or from the host apparatus 300, the controlling part 150 controls the printing part 160 to print the file transmission and reception list in a form or format desired by the user on a medium, such as paper.

Figure 3:
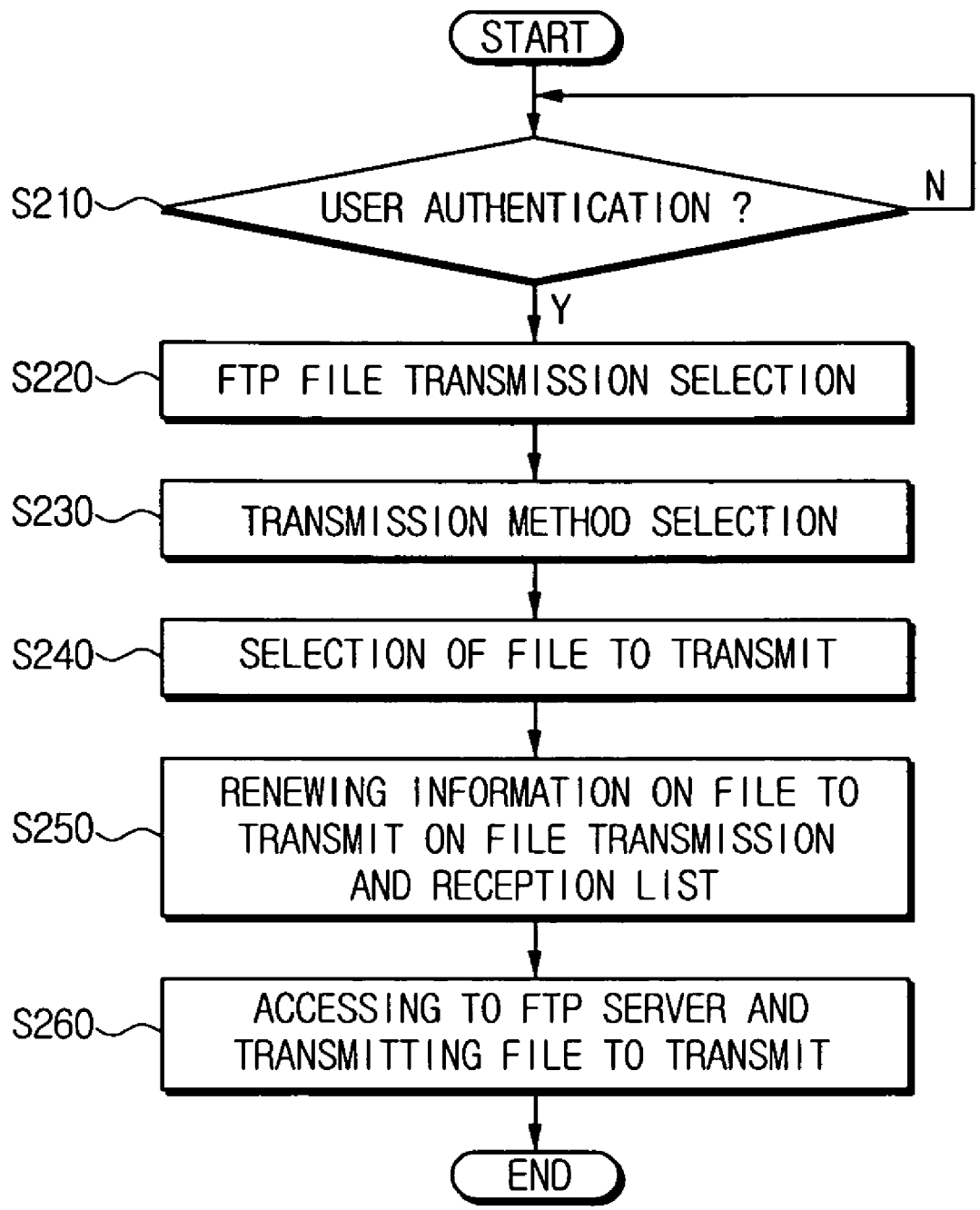
FIG. 3 is a flowchart illustrating file transmission operations of an image forming apparatus according to an embodiment of the present general inventive concept.

FIG. 3 is a flowchart illustrating transmission operations of an image forming apparatus according to an embodiment of the present general inventive concept.

Referring to FIGS. 1 through 3, when the user inputs the ID and the password through the inputting part 110, the controlling part 150 determines whether to grant authorization to the user at operation S210.

When the user fails to be authorized at operation S210 because the input ID and password do not correspond to a stored ID and password for the user, the controlling part 150 displays an error message informing the user of the authorization failure on the displaying part 120, and keeps the image forming apparatus 100 locked, so that the user is not able to use any function of the image forming apparatus 100. Alternatively, the controlling part 150 can allow the user limited use of a subset of functions of the image forming apparatus when the user fails to be authorized. For example, the user who fails to be authorized may be allowed only to receive a data file from the FTP server 200 and to print the data file, or to transmit a data file to a particular FTP server. The method may skip operation S210 if the image forming apparatus 100 does not include a user authorization function, or may immediately proceed to operation S220 when the input ID and password correspond to the stored ID and password for the user.

After the user is granted authorization at operation S210, the user may input a command to the inputting unit 110 to transmit a data file using the FTP at operation S220. The controlling part 150 then displays a menu for the user to select a desired transmission method on the displaying part 120 at operation S230. Suitable transmission methods include, but are not limited to, transmitting a data file stored at the storing part 130 or at the external storage medium (not illustrated), and transmitting a scanned data file scanned by the scanning part 140.

When the user selects the transmission of the data file stored at the storage part 130 or at the external storage medium (not illustrated), the controlling part 150 displays a list of data files stored at the storage part 130 or at the external storage medium (not illustrated), and the user then selects which data file to transmit at operation S240. Alternatively, when the user selects the transmission of the scanned file, the controlling part 150 controls the scanning part 140 to scan a document, to create a digital image data file corresponding to the scanned document, and to select the digital image data file as the data file to transmit at operation S240.

The controlling part 150 updates the file transmission and reception list at operation S250 with the information on the file selected at operation S240. The controlling part 150 then grants access to the FTP server 200 to transmit and to store the data file at operation S260.

Although FIG. 3 illustrates a user authorization operation as a first operation, the user authorization operation may occur at any time and at multiple times during operation of the method. The ID and password may be requested at operation S260. When the user inputs the ID and password corresponding to the stored ID and password, the controlling part 150 transmits to the FTP server 200, and adds the input ID and password in the file transmission and reception list. FIG. 3 illustrates updating the file transmission and reception list first and transmitting the file to transmit is transmitted thereafter; however, it is also possible to transmit the file first and to update the file transmission and reception list thereafter.

Figure 4:
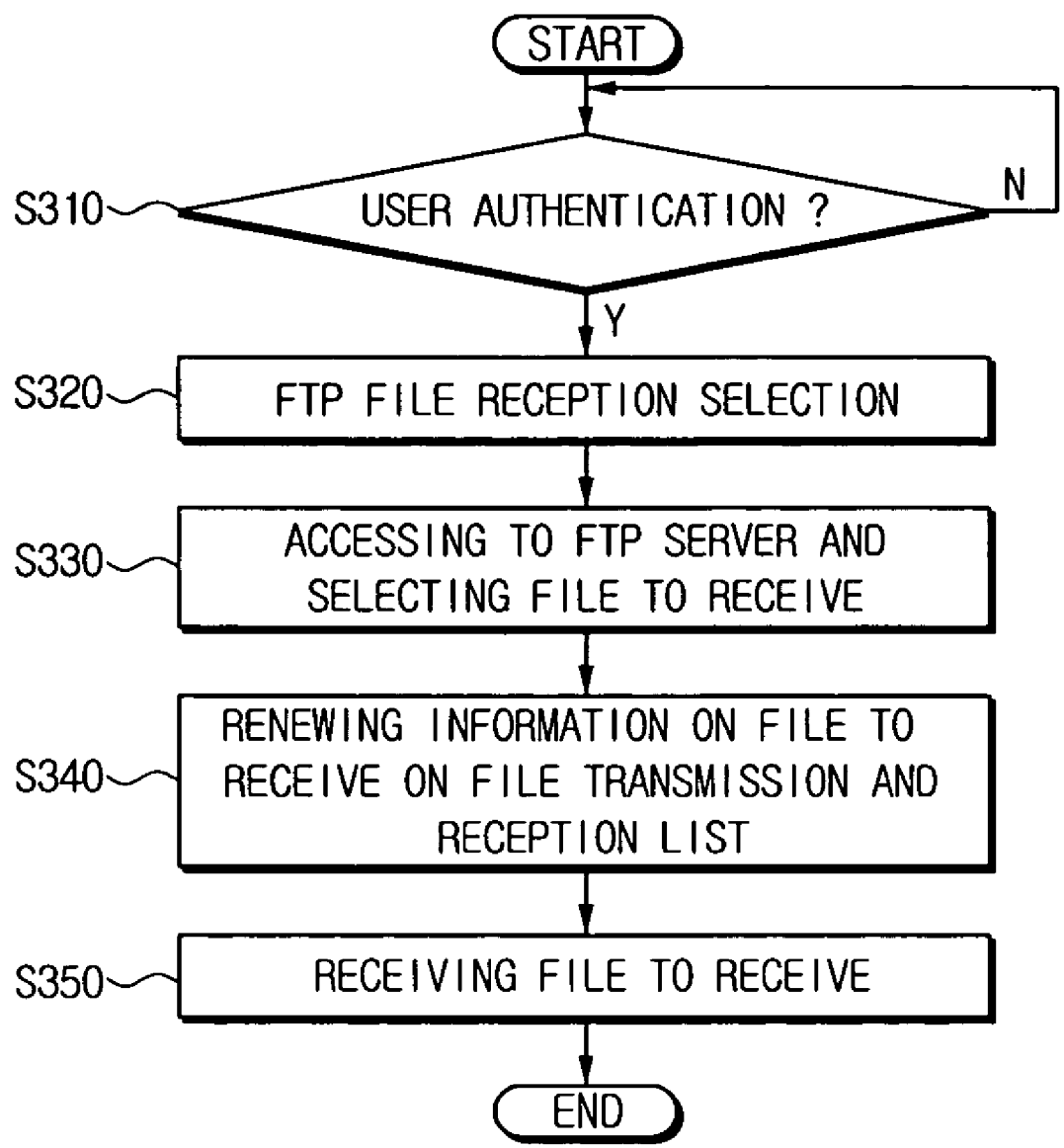
FIG. 4 is a flowchart illustrating file reception operations of an image forming apparatus according to an embodiment of the present general inventive concept.

FIG. 4 is a flowchart illustrating reception operations of an image forming apparatus according to an embodiment of the present general inventive concept.

Referring to FIGS. 1, 2 and 4, a user may input an ID and a password to the inputting part 110. The controlling part 150 may grant authorization to the user when the input ID and password corresponding to a stored ID and password for the user at operation S310. When the user authorization fails at operation S310, the user may be prevented from using any functions of the image forming apparatus 100, or may be granted only limited access to use a specified subset of functions of the image forming apparatus 100.

After the user is granted authorization at operation S310, the user may select a data file reception function using the FTP through the inputting part 110 at operation S320. At operation S330, the controlling part 150 accesses the FTP server 200, reads the data files stored therein and displays a list of the data files on the displaying part 120, so that the user can select the data file to receive.

The controlling part 150 updates the file transmission and reception list at operation S340 based on the information on the files selected at operation S330. The controller part 150 then receives the data file from the FTP server 200 and stores the data file at the storing part 130 at operation S350.

Although FIG. 4 illustrates a user authorization operation as a first operation, the user authorization operation may occur at any time and at multiple times during operation of the method. The ID and password may be requested at operation S330. When the user inputs the ID and password corresponding to the stored ID and password, the controlling part 150 transmits the ID and the password to the FTP server 200, and adds the input ID and password to the file transmission and reception list.

Figure 5:
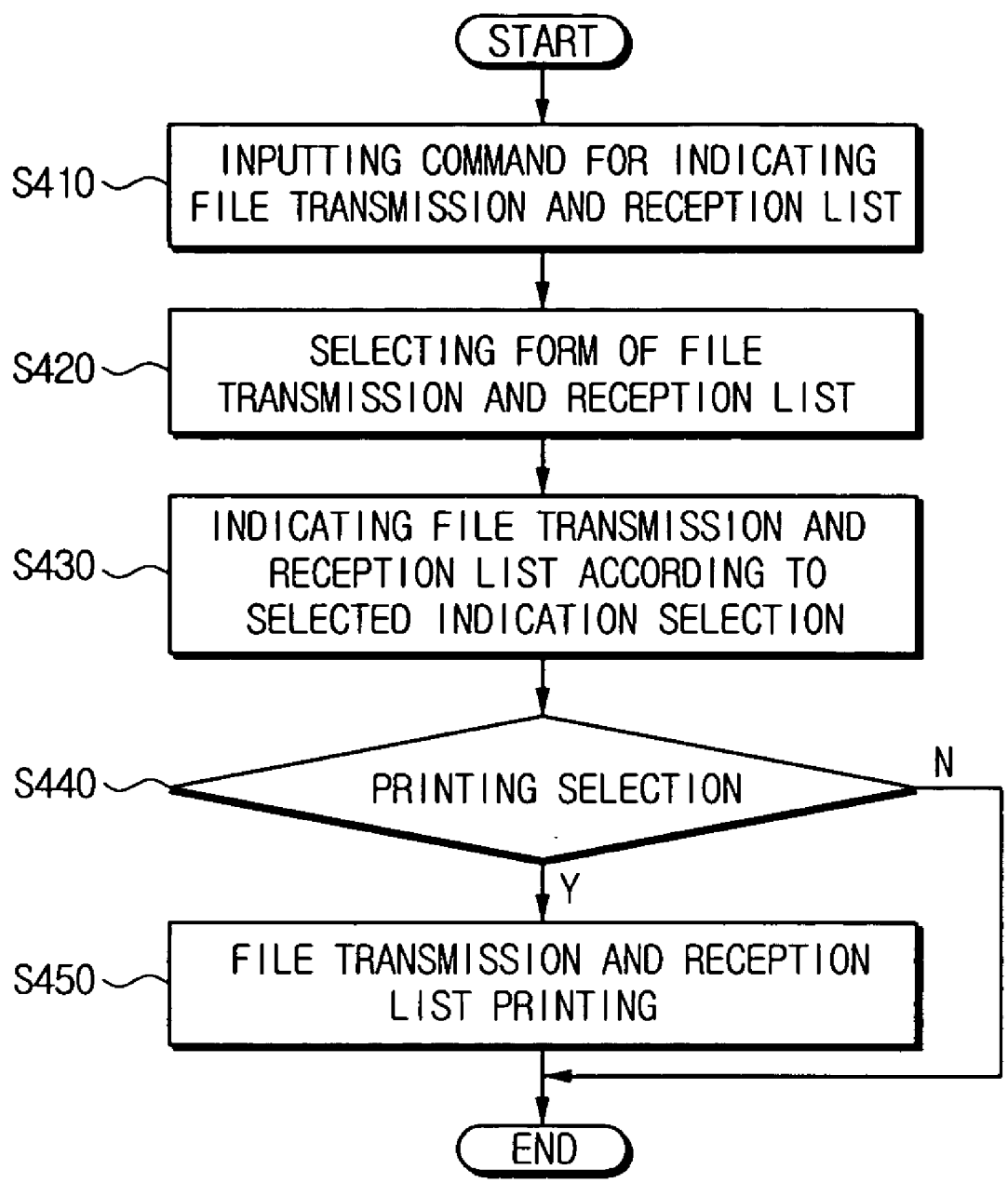
FIG. 5 illustrates displaying and printing operations of a file transmission and reception list according to an embodiment of the present general inventive concept.

FIG. 5 is illustrates displaying and printing operations of a file transmission and reception list according to an embodiment of the present general inventive concept.

Referring to FIGS. 1, 2, and 5, a user may input a command in the inputting part 110 to receive the list at operation S410. When the file transmission and reception list is received by the user from the inputting part 110 or from the host apparatus 300 at operation S410, the controlling part 150 displays menus having display form and format options for the list for the user to choose from. The user selects a display form or format from the menu in which the file transmission and reception list will be displayed on a displaying unit (not illustrated) of the displaying part 120 or the host apparatus 300 at operation S420. The menus may include, but are not limited to, a 'whole review' item to request the file transmission and reception list for all files transmitted and received from the image forming apparatus 100, a 'period designation' item to request the file transmission and reception list for all files transmitted and received on a particular month or during a particular time period, and a 'user designation' item to request the file transmission and reception list for all files transmitted and received by a particular user. The menus may include other items in the menu in addition to, or instead of, those listed above.

The controlling part 150 processes the file transmission and reception list according to the display form selected by the user, and displays the list on the displaying unit of the displaying part 120 or on the host apparatus 300 at operation S430.

If a command for printing the file transmission and reception list is input from the inputting part 110 or from the host apparatus 300 at operation S440, the controlling part 150 controls the printing part 160 to print the file transmission and reception list on a medium, such as paper, at operation S450. In the absence of a command to print at operation S440, the method skips operation S450 and the method ends.

Various embodiments of the present general inventive concept can be embodied as computer readable codes on a computer readable recording medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

For example, the controlling part 150 of the image forming apparatus 100 may be embodied in software, in hardware, or in a combination thereof. In various embodiments, the controlling part 150 may be embodiment as computer readable codes on a computer readable recording medium to perform file transmission operations, such as the file transmission operations illustrated in FIG. 3. Further, in various embodiments, the controlling part 150 may be embodiment as computer readable codes on a computer readable recording medium to perform file reception operations, such as the file reception operations illustrated in FIG. 4. Still further, in various embodiments, the controlling part 150 may be embodiment as computer readable codes on a computer readable recording medium to perform displaying and printing operations, such as the displaying and printing operations illustrated in FIG. 5.

As abovementioned, according to an embodiment of the present general inventive concept, it is possible to easily track and store information on data files transmitted and received from an image forming apparatus, and to use the information for security management of the image forming apparatus. For example, when a secure file is leaked from the image forming apparatus, it is easy to obtain source data on a user who is responsible for the security leak.

It is also possible to access to an FTP server using the ID and a password of the user included in the file transmission and reception list, so that illegally-transmitted files can be downloaded from the FTP server, to be confirmed or deleted.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   a storage unit;
   a communication unit;
   a scanning unit to scan a document and to generate scanned image data;
   a printing part to execute printing based on the scanned image data;
   a controlling unit; and
   an inputting part configured to receive printing and scanning operation commands, the inputting part further configured to receive an user input to select a file to be transmitted to an external FTP server,
   wherein, in response to the user input requesting the selected file to be transmitted the external FTP server, the image forming apparatus operates as an FTP (File Transfer Protocol) client by initiating a connection with the external FTP server and transmitting the selected file from the image forming apparatus to the external FTP server via a File Transfer Protocol (FTP) using the communication unit of the image forming apparatus, and
   wherein the file transmitted to the external FTP server is selected, from a plurality of files stored in the storage unit, in response to the user input received via the inputting part of the image forming apparatus.

2. The image forming apparatus of claim 1, wherein the controlling unit manages a lob list including one or more FTP job records corresponding to one or more files that have been transmitted via FTP, where the FTP job records comprise:

at least one of a user name, a date of file transmission, a date of file reception, a file name, a file size, a user ID, and a user password to log in the external FTP server having the files.

3. The image forming apparatus of claim 2, wherein the:
inputting part receives a display command to display the at least one of the FTP job records and the job list.

4. The image forming apparatus of claim 3, wherein the controlling unit displays that at least one of the FTP job records and the job list on a display screen of the image forming apparatus.

5. The image forming apparatus of claim 4, wherein the controlling unit formats the at least one of the FTP job records and the job list and displays the formatted at least one of the FTP job records and the job list.

6. The image forming apparatus of claim 5, wherein the formatted job list comprises at least one of statistics on a number and sizes of files transmitted and received during a time period, and specifications of the files transmitted and received by a user.

7. The image forming apparatus of claim 2, wherein the controlling unit transmits the at least one of the FTP job records and the job list to an external host apparatus.

8. The image forming apparatus of claim 2, further comprising:
a printing part to print the at least one of the FTP job records and the job list.

9. The image forming apparatus of claim 2, wherein the controlling unit assigns an unauthorized user name a no-name value to transmit and receive data files without user authorizations.

10. The image forming apparatus of claim 1, further comprising:
a control panel to select a file reception function to receive a file via the FTP from a designated external device, when the file reception function is selected, the control panel operable to display a list of files stored in the designated external device and to receive a user input to select a file from the list of the files to be received via the FTP, and the controlling unit updates a job list by including a FTP job record regarding the file received via the FTP.

11. The image forming apparatus of claim 1, wherein the controlling unit is configured to manage a job list including one or more FTP job records corresponding to one or more files that have been transmitted via the FTP, each FTP job record including an address of the external FTP server to which a file is transmitted via the FTP, and
the inputting part is operable to display the job list managed by the controlling unit and to receive a user input to select at least one of the one or more FTP job records from the job list for display on the display screen of the control panel.

12. A method of controlling an image forming apparatus, the method comprising:
scanning a document with a scanning unit and generating scanned image data;
executing printing with a printing part based on the scanned image data;
receiving printing and scanning operation commands with an inputting part and receiving an user input to select a file to be transmitted to an external FTP server with the inputting part,
in response to the user input requesting the selected file to be transmitted the external FTP server, operating the image forming apparatus as an FTP (File Transfer Protocol) client by initiating a connection with the external FTP server and transmitting the selected file from the image forming apparatus to the external FTP server via a File Transfer Protocol (FTP) using a communication unit of the image forming apparatus,
wherein the file transmitted to the external FTP server is selected, from a plurality of files stored in the storage unit, in response to the user input received via the inputting part of the image forming apparatus.

13. The method of claim 12, further comprising:
storing at least one of a user name, a date of file transmission, a date of file reception, a file name, a file size, an address of a file recipient, a user ID, and a user password of one or more FTP job records corresponding to one or more files that have been transmitted via FTP in a storage unit of the image forming apparatus to log in the external FTP server transmitting and receiving files with respect to the FTP client of the image forming apparatus.

14. The method of claim 13, further comprising:
receiving a display command with the image forming apparatus to display at least one of the FTP job records and a job list of the one or more FTP job records on a display screen of the image forming apparatus.

15. The method of claim 14, further comprising:
displaying the at least one of the FTP job records and the job list on the display screen.

16. The method of claim 15, wherein the displaying of the at least one of the FTP job records and the job list on the display screen comprises displaying the at least one of the FTP job records and the job list on the display screen in a predetermined format.

17. The method of claim 16, wherein the predetermined format comprises at least one of statistics on a number and sizes of files transmitted and received during a time period, and specifications of the files transmitted and received by a user.

18. The method of claim 13, further comprising:
receiving a command to display at least one of the FTP job records and a job list of the one or more FTP job records on a display screen with the image forming apparatus from an external host apparatus; and
transmitting the at least one of the FTP job records and the job list on the display screen with the image forming apparatus with the communication unit of the image forming apparatus.

19. The method of claim 13, further comprising:
receiving a print command with the image forming apparatus to print at least one of the FTP job records and a job list of the one or more FTP job records on a display screen with the image forming apparatus; and
printing the at least one of the FTP job records and the job list on the display screen with a printing part of the image forming apparatus.

20. The method of claim 13, wherein the files comprise unauthorized transmitted and received files stored under a no name alias in the job list.

21. The method of controlling an image forming apparatus of claim 12, further comprising:
receiving a selection of a file reception function with a control panel of the image forming apparatus to receive a file via the FTP from a designated external device; and
when the file reception function is selected, displaying a list of files stored in the designated external device with the control panel, receiving a user input to select a file from the list of the files to be received via the FTP, and updating a job list with a controlling unit of the image forming apparatus by including a FTP job record regarding the file received via the FTP.

* * * * *